United States Patent [19]

Mayeux et al.

[11] Patent Number: 5,861,362
[45] Date of Patent: Jan. 19, 1999

[54] ALMOND SHELL ADDITIVE AND METHOD OF INHIBITING STICKING IN WELLS

[76] Inventors: Herman Joseph Mayeux, 112 W. Betty St., Rayne, La. 70578; Earl Campbell Ruby, 4918 Schuyler Dr., Carmichael, Calif. 95608

[21] Appl. No.: 82,907

[22] Filed: Jun. 29, 1993

Related U.S. Application Data

[63] Continuation of Ser. No. 816,552, Jan. 6, 1992, abandoned.

[51] Int. Cl.[6] .............................. C09K 7/02; C09K 7/06
[52] U.S. Cl. ............................................. 507/104; 175/72
[58] Field of Search .............................. 507/104; 175/72

[56] References Cited

U.S. PATENT DOCUMENTS

| | | | |
|---|---|---|---|
| 2,799,647 | 7/1957 | Borchardt | 252/8.5 |
| 3,228,469 | 1/1966 | Kern et al. | 166/29 |
| 3,788,405 | 1/1974 | Taylor | 175/72 |
| 3,987,855 | 10/1976 | Messenger | 166/294 |
| 4,063,603 | 12/1977 | Rayborn | 175/65 |
| 4,123,367 | 10/1978 | Dodd | 252/8.5 |
| 4,270,620 | 6/1981 | Lawrence | 175/322 |
| 4,298,078 | 11/1981 | Lawrence | 175/72 |
| 4,368,787 | 1/1983 | Messenger | 175/319 |
| 4,423,791 | 1/1984 | Moses, Jr. | 175/65 |
| 4,427,080 | 1/1984 | Steiger | 175/325 |
| 4,428,441 | 1/1984 | Dellinger | 175/61 |
| 4,460,052 | 7/1984 | Gockel | 175/72 |
| 4,498,995 | 2/1985 | Gockel | 252/8.5 |
| 4,531,594 | 7/1985 | Cowan | 175/72 |
| 4,614,599 | 9/1986 | Walker | 252/8.512 |
| 4,633,950 | 1/1987 | Delhommer et al. | 166/295 |
| 4,635,726 | 1/1987 | Walker | 166/294 |
| 4,664,816 | 5/1987 | Walker | 252/8.5 |
| 4,704,213 | 11/1987 | Delhommer et al. | 252/8.512 |
| 4,964,465 | 10/1990 | Surles | 166/295 |
| 5,004,553 | 4/1991 | House et al. | 252/8.51 |

FOREIGN PATENT DOCUMENTS

| | | |
|---|---|---|
| 1253846 | 5/1985 | Canada . |
| 0209343 | 1/1987 | European Pat. Off. . |
| 3400739 | 7/1985 | Germany . |

OTHER PUBLICATIONS

C.C. Newhouse, "Successfully Drilling Severely Depleted Sands", SPE/IADC 21913, 1991 SPE/IADC Drilling Conference held in Amsterdam, 11–14 Mar. 1991.

Perry's Chemical Engineers' Handbook, 4th Ed. McGraw–Hill Book Co., pp. 21–51 (1963).

Industrial Flour and Aggregate Technical Bulletin, from Agrashell, Inc., Los Angeles, California (investigating date of publication).

Liquid Casing / O.M. Seal Technical Bulletin, 1987, from Magnum Mud & Chemical International, Inc., Lafayette, CA (1987).

*Primary Examiner*—Philip Tucker
*Attorney, Agent, or Firm*—Banner & Witcoff, Ltd.

[57] ABSTRACT

An almond shell additive for a well working fluid is provided, wherein the almond shells are ground to certain particle size ranges to prevent, inhibit or remedy the occurrence of downhole equipment sticking. Also provided are wellworking fluids containing the almond shell additive and well working processes utilizing such compositions. The additive is also useful to reduce wall cake thickness and permeability, enhance well cake toughness, seal off depleted sands and micro fractures, reduce or prevent seepage loss, control dynamic spurt loss, and reduces drag and torque.

7 Claims, 1 Drawing Sheet

ALMOND SHELL ADDITIVE AND METHOD OF INHIBITING STICKING IN WELLS

This application is a continuation of application Ser. No. 07/816,552, filed Jan. 6, 1992 now abandoned.

BACKGROUND OF THE INVENTION

1. Field of the Invention

This invention relates to compositions for use in well-working operations such as drilling, workover and completion, packing and the like, well-working processes utilizing such compositions, and an additive to prevent, inhibit or alleviate differential or mechanical sticking of downhole equipment in well boreholes.

In the drilling of oil wells, gas wells, injection wells and other boreholes, various strata are bypassed in achieving the desired depth. Each of these subsurface strata has associated with it physical parameters, e.g., porosity, liquid content, hardness, pressure, etc., which make the drilling art an ongoing challenge. Drilling through a stratum produces an amount of rubble and frictional heat; each of which must be removed if efficient drilling is to be maintained. In rotary drilling operations, a string of drill pipe having a drill bit mounted on the lower end thereof is rotated to cause the bit to make the hole. Heat and rock chips are removed by the use of a liquid known as drilling fluid or mud. Typically, drilling fluid is circulated down through the drill string, out through orifices in the drill bit where it picks up rock chips and heat and returns up the annular space between the drill string and the borehole wall to the surface. There it is sieved, reconstituted and directed back down into the drill string. The rotation of the drill string and circulation of the drilling fluid are substantially continuous while drilling, being interrupted for essential operations such as adding an additional section of drill pipe to the top of the drill string or when the entire string is disassembled and pulled from the well bore (called "tripping"). Periodically during interruptions in the drilling operation and also at its conclusion, downhole tools such as logging tools are inserted into the bore and subsequently recovered, and casing is inserted into the bore and set.

The flow properties of the drilling fluid play a vital role in the success of the drilling operation. These properties are primarily responsible for the removal of drill cuttings but influence drilling progress in many other ways. Unsatisfactory performance can lead to such serious problems as bridging the hole, filling the bottom of the hole with drill cuttings, reduced penetration rates, hole enlargement, stuck pipe, loss of circulation, and even a blowout.

Drilling fluid may be as simple in composition as clear water or it may be a complicated mixture of clays, thickeners, dissolved inorganic components, and weighting agents. The characteristics of the drilled geologic strata and, to some extent, the drilling apparatus determine the physical parameters of the drilling fluid. For instance, while drilling through a high pressure layer, e.g., a gas formation, the density of the drilling fluid must be increased to the point that the hydraulic or hydrostatic head of the fluid is greater than the downhole pressure of the stratum to prevent gas leakage into the annular space surrounding the drill pipe and lower chances for a blowout.

The particle size in common drilling fluids is, as general rule, from about 0.5 to 5 microns, with a small percentage (perhaps as much as 5%) of the particles being as large as 325 mesh (44 microns). The balance of the particles above this range are removed in process of preparation and in separation of the rock cuttings prior to recirculation of the drilling fluid. Because of the constant cleaning and removal of larger particles, the drilling fluid can bridge only very small fissures (less than 0.002 in.) within the formations as the muds are normally used.

In strata which are porous in nature with openings or fissures larger than about 0.001 to 0.002 inch and additionally have a low formation pressure, another problem occurs. Some of the drilling fluid, because of its hydrostatic head being greater than the formation pressure, migrates out into the porous layer rather than completing its circuit to the surface. One common solution of this problem is to use a drilling fluid which contains bentonite clay or other filtration control additives. Typically, such additives have particles of a size slightly smaller than the size of the pore openings of the formation. The porous formation tends to filter the filtration control additive from the drilling fluid and forms a filter cake on the borehole wall thereby preventing the outflow of drilling fluid. The liquid which enters the formation while the cake is being established, is known as the surge loss or spurt loss, while the liquid which enters after the cake is formed is known as the drilling fluid filtrate. The permeability of the filter cake is directly related to the particle size distribution in the drilling fluid, and in general, the cake permeability decreases as the concentration of particles in the colloidal size range increases. See House, U.S. Pat. No. 5,004,553. As long as this filter cake is intact, very little fluid is lost to the formation.

In general, it is most economical to use a water-based fluid over an oil-based drilling fluid, from the standpoint of original cost, maintenance and protecting the ocean environment. Accordingly, oil-based drilling fluids are not desirable, unless essential to the drilling operation. Many formation evaluation, or well logging, tools depend upon the use of water-based drilling fluids because such fluids are electrically conductive through the earth formation, rather than insulative, as in the case of oil-based drilling fluids.

It is known by those skilled in the art that stuck pipe is one of the most common hazards encountered in drilling operations. One of the primary causes of drill string "sticking" is the effect of differential pressure between the hydrostatic head of the drilling fluid column in the well bore and any porous, low-pressure earth formations through which the drill string passes. Under such conditions, the pressure difference presses the drill pipe against the borehole wall with sufficient force to prevent movement of the pipe. This occurs because the density or weight of the drilling fluid in the well bore creates a hydrostatic pressure against the pipe that is substantially greater than that in a porous earth formation traversed by the well bore. This is due to the filtrate (typically water in the drilling fluid) flowing through the desirable "mud cake" and the well bore wall into the low pressure formation. This condition may occur in the drill collar section of the drill string which is used to apply weight to the bit directly above the drill bit and when the return drilling fluid flow around the smaller diameter drill string is less turbulent and hence relatively laminar. Thus, where the drill pipe lies close to one side of the well bore, as in slant holes, higher differential pressure across the drill pipe increases its adherence to the side of the well bore. In a worst case, this results in differential pressure sticking of the drill string. However, differential sticking of pipe more frequently occurs after circulation and rotation have been temporarily suspended, as when making a connection.

Correction of drill string sticking conditions usually requires a decrease in the drilling fluid pressure in the well either by reducing the hydrostatic head of the drilling fluid or increasing solids content of the fluid to reduce filtrate loss, with subsequent building of a thicker filtercake to increase the pipe contact area. Alternatively, sticking can sometimes be avoided by using smaller diameter drill pipe, or fewer drill collars in the weight assembly above the bit. The problem of differential pipe sticking is frequently severe where a well encounters over-pressured formations. In such wells, the formation pressure exceeds the pressure to be normally expected due to hydrostatic head alone at that depth. In such wells passing through overpressured formations the counterbalancing hydrostatic pressure in the well cannot be reduced safely at deeper depths when an underpressured formation is encountered. However, such greater pressures on deeper formations may substantially increase the risk of fracturing the formation, with accompanying loss of drilling fluid from the well into the fracture, and creating potential well blow-out.

It is also known that frequently a drill string may stick in a drilling well because of mechanical problems between the drill string and the well bore itself. Such a condition can sometimes occur in what is known as the "keyseat effect". That is, a keyseat is created when the drill string collar or a pipe joint erodes a circular slot the size of the drill pipe tube or tool joint outside diameter in one side of the larger circular bore hole, as originally cut by the drill bit. Such a slot can create greatly increased friction or drag between the drill string and the earth formation and result in seizure of the drill collars when an attempt is made to pull the string out of the hole and the collars become wedged in the keyseat. Such problems can also be created by excessive weight on the drill string so that the drill string buckles in the lower section and particularly where the bore hole has a high angle, say in excess of 60° from vertical, or the well bore includes more than one change of direction, such as an S-curve or forms one or more "dog-legs" between the drilling platform and the drill bit. It is also known that in mechanical sticking of drill string, earth formations around the well may be sufficiently unstable so that the side wall collapses or sloughs into the well bore and thereby sticks the pipe.

Economics also play a significant role in drilling wells with potential sticking tendencies. C. C. Newhouse points out that analysis of stuck pipe data for Chevon's Gulf of Mexico operations during 1988 showed that each incident cost an average of $700,000.00. He further states that although the reservoir pressures are known, depleted sands can present serious drilling problems and substantial cost increases. Differential sticking of drill pipe, casing and logging tools; and tight hole conditions due to excessive filtrate loss and cake buildup are some of the problems which may occur. Additional casing strings may also be required to cover these zones. Effectively plugging the depleted intervals is the key to preventing most of these problems. See C. C Newhouse, "Successfully Drilling Severely Depleted Sands," Paper SPE 21913 Presented at the 1991 SPE/IADC Conference held in AmsterDam, 11–14 Mar. 1991.

2. Prior Art

The extent of each pipe sticking problem generally depends upon the amount of time the operator is willing to "wash over" the stuck section of the drill pipe (after unthreading and removal of the unstuck portion), or to "fish" by otherwise manipulating the drill string. Correction may also include spotting or completely replacing the water-based drill fluid with a spotting agent. The spotting agents are often oleophilic compositions and may be oil-based drilling fluids, invert emulsions of water in oil, or a material as readily available as diesel oil. After the slug of, typically, 10–15 barrels of spotting agent is introduced, addition of drilling fluid is re-commenced. The slug of spotting agent continues its trip down through the drill string, out the drill bit, and up the wellbore annulus until it reaches the site of the stickage. Upon arrival of the spotting agent at the stickage location, circulation is temporarily ceased. Those skillful in this art speculate that oil-based spotting agents tend either to dehydrate the filter cake on the borehole wall and cause it to break up or to reduce the coefficient of friction between the filter cake and the drill string, thereby allowing the drill string to come free. In any event, once movement of the drill string is detected, circulation of the drilling fluid is restored. It should be observed that the cost of this process is high and the success rate only moderate. Furthermore, this method does not inhibit the occurrence or reoccurrence of differential sticking. Failure to free the drill string results either in abandoning the well bore or side tracking the bore hole above the stuck point. This may include loss of the drill bit, collars and stuck lengths of pipe in the bore hole.

The problem of sticking pipe has been described in numerous publications in the literature, particularly as it relates to differential sticking of the drill string to the well bore, that is, adherence of the drill string against a porous formation so that there is no circulation of drilling fluid around one side of the drill string. Such literature is in part directed to the use of various pieces of drilling equipment or drilling procedures, which typically involve a higher capital expense. The following are examples of such drilling equipment and procedures.

Dellinger, U.S. Pat. No. 4,428,441, proposes the use of noncircular or square tool joints or drill collars, particularly in the drill string directly above the drill bit. Such shape assures that circulation is maintained around the drill pipe and reduces the sealing area between the pipe and the side wall where the differential pressure may act. However, such tools are expensive and not commonly available. Further, they may tend to aggravate the keyseat problem in relatively soft formations since the square edges of such collars may tend to cut the side wall in high angle holes.

Lawrence, U.S. Pat. No. 4,298,078, proposes using a special drill section directly above the drill bit to permit jarring the drill bit if the pipe tends to stick. Additionally, valves in the tool may be actuated to release drilling fluid around the drill string to assist in preventing or relieving a stuck drill string condition.

Steiger, U.S. Pat. No. 4,427,080, is directed to binding a porous layer on the outside of the drill string. Such a coating is stated to prevent differential pressure sticking of the pipe by increasing liquid flow around the drill string.

Messenger, U.S. Pat. No. 4,368,787, proposes reversing the circulation of the drilling fluid using a pump powered by the cones of the rotary bit. The drilling cuttings are thus removed by pumping the drilling fluid up and out the drill pipe and therefor kept out of the annulus.

Cloud, Canadian Patent 1,253,846, proposes mitigating the problems of differential pressure sticking and of packoff in the borehole upon removal of the drill string by using upwardly or backwardly directed jets, for example, in the drill collars or heavy weight pipe joints to aid in the removal of cuttings from the borehole.

Alternatively, such literature discloses the use of methods to avoid differential sticking by assuring that the drilling fluid is tailored to match the earth formations penetrated by the well bore. However, in drilling new or deep wells, where intimate knowledge of the formations is not available, and particularly where low pressure formations are to be encountered, it is difficult to predict and take corrective, or preventive, action prior to such drill pipe sticking. Further, while these problems can be avoided by deeper casing of the bore hole around the drill string, such casing is expensive and in general undesirable, because it limits formation evaluation with conventional well logging tools. As noted above, this also is a primary reason that oil-based drilling fluids (which are insulative) are not desirable, unless essential to the drilling operation.

Examples of drilling fluids additives used to avoid or remedy stuck pipe include the following:

Moses, U.S. Pat. No. 4,423,791, discloses avoiding differential sticking by use of glass beads in the drilling fluid to inhibit formation of a seal by the filter cake between the drill string and the well bore adjacent a low pressure zone. The glass beads have a particle size of 9.84 to 187 mils (U.S.A. Sieve Series 4 to 60).

Two other types of specialty products which have been used in preventing differential sticking while drilling depleted sands are Gilsonites (Registered trade mark of the American Gilsonite Company) and cellulose fibers. In severe conditions, one or both products may be maintained in the mud system. Although both products improve the plugging efficiency of drilling fluids, they function in a different manner.

Gilsonite is a naturally occurring carbonaceous material that is classified as an asphaltite and has a softening point of 330°–400° F. Its primary use is to improve borehole stabilization by sealing off microfractures and forming a plating film on the borehole face. The malleable and insoluble nature and PSD (particle size distribution) of Gilsonite are the means by which it is effective in sealing permeable formations and improving the filter cake quality. Field use has shown that it helps reduce HTHP fluid loss and can reduce torque and drag.

This product is normally maintained in concentrations up to 4 lbm/bbl and is most effective if added before penetrating the troublesome interval. The kickoff point normally provides a good place to start additions of Gilsonite, since it can aid in lubricity. This product also functions well with cellulose fiber products, but should be pilot tested to ensure the optimum concentrations.

Cellulose fibers have also been used in plugging permeable formations. Most were formulated to control seepage loss and differential sticking instead of shale stabilization like the Gilsonite. They typically function by swelling and wedging into the pore throat once exposed to a differential pressure. This has proven beneficial in decreasing mechanical erosion. Another advantage of this product is that it is very effective if used in sweeps, even after problems begin. Hydration of the product in water and caustic before adding it to the system is beneficial in high solids muds. Since several manufacturers offer their fiber products in coarse and fine grinds, the PSD of the drilling fluid can be adjusted to accommodate a wide range of permeabilities.

Concentrations when maintaining cellulose fiber products in the system, range between 3–8 lbm/bbl (PPB). Fiber products can be added at any point in the hole since they are not temperature dependent. Additions should begin early enough to ensure the optimum concentration is being maintained before drilling the depleted interval. They can be added much like the Gilsonite products, sweeps first. These products are compatible with virtually all water-based and oil-based mud systems. A few precautions to note about these products is that they will decrease alkalinities and can ferment if the pH is below 9.

In less severe cases, sweeps formulated in the drilling fluid are frequently used instead of maintaining the product in the system. They normally contain between 10 and 25 lbm/bbl. This method has proved effective in plugging off small troublesome areas and massive sands when the mud weight is low. They are also effective if pumped just after drilling through the depleted zone, while circulating the hole clean before a trip, or before pulling out of the hole to log. This will ensure a complete PSD is available to decrease the filter cake permeability. The rheology and alkalinities are checked prior to pumping the sweep. Additions of water and/or thinners may be required to lower rheological properties.

In extreme cases, spotting pills in the open hole before a trip can improve conditions once drilling is resumed. They contain lower concentrations than sweeps to prevent dehydration of the mud.

Another important factor is that the smallest shaker screens desired cannot always be used since they can strip the larger products from the system. Screen sizing should be based on the PSD of the product and the cut point of the screens. As a result, more dilution is typically required to control the drilled solids. Actual screen sizing should be determined by evaluating the cuttings on the shakers.

There are cheaper products; such as calcium carbonate, nut plug, and mica, that can be used to improve the PSD of the drilling fluid. They may not necessarily improve the plugging performance of the fluid because they are not deformable and do not swell upon entering the pore throats. These products can actually get in the way of the beneficial solids and act as a proppant.

As noted above, most cellulose fibers were formulated to control seepage loss (or loss circulation) and differential sticking. In order to combat or prevent lost circulation, it has been common in the past to add any number of materials to the drilling fluid which act to reduce or prevent flow of the drilling fluid outwardly into a porous stratum by reducing or limiting the permeability of the formation being drilled, thereby arresting a lost circulation condition. Such prior known cellulose fiber materials include fibrous, flake and granular ground forms thereof. Representative of such cellulose fibers include nut and seed shells or hulls (pecan, almond, walnut, peach, brazil, coconut, peanut, sunflower, flax, cocoa bean, cottonseed, rice, linseed, oat). See House et al., U.S. Pat. No. 5,004,553. See also Borchardt, U.S. Pat. No. 2,799,647 (almond shells); Gockel, U.S. Pat. Nos. 4,460,052 and 4,498,995 (granular: walnut shells, pecan shells, almond shells; fibers: sunflower seed-hulls, cottonseed hulls); Kern et al., U.S. Pat. No. 3,228,469 (coarse almond shells); Walker, U.S. Pat. Nos. 4,614,599, 4,635,726 and 4,664,816 (almond hulls, walnut hulls); Surles, U.S. Pat. No. 4,964,465 (almond hulls, walnut hulls); Delhommer et al., U.S. Pat. Nos. 4,633,950 and 4,704,213 (almond hulls, walnut hulls). Delhommer, Surles and Walter also cite Gockel '995. Of the foregoing cellulose fiber materials, peanut shells and walnut shells are known to have been used for differential sticking problems with moderate success. The other cellulose fiber materials have been tried, but apparently without much success.

SUMMARY OF THE INVENTION

Therefore, it is an object of the present invention to provide an additive which is economically effective as an agent to inhibit or alleviate the occurrence of sticking useful in both water-based and oil-based well working fluids without adversely affecting fluid rheological properties.

It is an object of the present invention to provide an additive which is economically effective as an agent to reduce formation permeability in both water-based and oil-based well working fluids without adversely affecting fluid rheological properties.

It is another object of this invention to control dynamic spurt loss, specifically, to limit or reduce the amount of fluid which enters the formation while drilling.

Still another object of this invention is to limit or reduce both the API and HTHP filtrates, specifically, to minimize the amount of liquid which enters the formation after the wall cake is established on the borehole.

It is an object of this invention to provide a method of inhibiting the occurrence of differential wall sticking.

It is a further object of this invention to provide a method of reducing the severity of any differential wall sticking which does occur.

It is a further object of this invention to provide a method of treating individual zones of possible sticking to inhibit the occurrence of differential wall sticking in that zone.

Accordingly, there is provided an almond shell additive for a well working fluid, e.g. a drilling fluid, and a method for preventing, inhibiting or alleviating downhole drilling equipment, e.g. drill string, sticking. The additive is also useful to reduce wall cake thickness and permeability, enhance well cake toughness, seal off depleted sands and micro fractures, reduce or prevent seepage loss, control dynamic spurt loss, and reduces drag and torque. Because of the almond shell additive unique properties, the almond shell additive of the present invention: provides reduction in formation permeability thus decreasing the chances of differential sticking of the drill string; reduces or limits dynamic spurt loss while drilling; reduces both the API and HTHP filtrates; protects producing formations from damage caused by harmful mud invasion (this results in more accurate log interpretations and actually enhances the production of the well); cleans the bit and provides a ball bearing affect (larger particles only); can be mixed with cement prior to cementing casing; provides a thinner, tougher, more impermeable filter cake downhole; is biodegradable; is environmentally safe; is highly deformable and compressible; and is ground processed as to enhance the utilization of the particles 30 percent naturally occurring lignin content. Therefore, the almond shell additive is multipurpose and can be substituted for conventional seepage control agents, lost circulation additive and fluid loss reducing agents.

More specifically, there is provided an almond shell additive for well working fluids, said additive consisting essentially of ground almond shells having an intermediate particle fraction having a substantially even particle size distribution between particle sizes of 100 microns and 2000 microns, a large particle fraction comprising at most about 5 percent by weight of said additive and having a particle size a particle size greater than 2000 microns, and a small particle fraction comprising at least 3 percent and at most 20 percent by weight based on said additive and having a particle size less than 100 microns.

Preferably, the small particle fraction comprises about 40 to 100 percent of the particles of said small particle fraction having a particle size greater than 50 microns and less than 100 microns and 0 to about 60 percent of the particles of said small particle fraction having a particle size from about 1 micron to 50 microns. This roughly corresponds to about 90 to 100 percent by weight of said small particle fraction having a particle size greater than 50 microns and less than 100 microns and 0 to about 60 percent by weight of said small particle fraction having a particle size from about 1 micron to 50 microns, respectively.

There is also provided a well working fluid comprising as a major constituent an oily petroleum liquid or an aqueous liquid and an effective amount of the almond shell additive for reducing or inhibiting the occurrence of the sticking of a downhole drilling equipment such as a drill string.

Additionally, there is provided a process for reducing or inhibiting the occurrence of drill string sticking. The process comprises adding an effective amount of the almond shell additive for inhibiting sticking to a well working fluid and circulating the well working fluid within a well borehole. Alternatively, there is provided a process for alleviating drill string sticking in a well borehole. The well borehole has an inlet and an outlet used to circulate the well working fluid and a borehole with a filter cake. The process comprises adding an effective amount of the almond shell additive for alleviating the sticking to a slug of well working fluid, injecting the slug into a well borehole proceeded and followed by the well working fluid, positioning the slug at the point or zone of the sticking, closing off the outlet of the well borehole near the surface, and continuing to inject the drilling fluid to force the almond shell additive into the borehole wall and filter cake to alleviate the sticking.

These and other objects of the invention will appear to one skilled in the art as the description thereof proceeds.

DETAILED DESCRIPTION OF THE PREFERRED EMBODIMENTS

In accordance with one illustrative embodiment of the invention, we have discovered that ground almond shells within a specific particle range is an excellent drilling fluid additive to reduce formation permeability and to inhibit pipe sticking or to alleviate or correct a pipe sticking problem.

It will be understood that the almond growing on the tree has an outer hull or husk which separates from the shell near maturity. The hull is entirely different from the inner protective casing referred to as the shell and it is to be understood that the hull or husk has no utility in the present invention with respect to reducing, inhibiting or alleviating drill string sticking.

The physical structure of the almond shell is basically different from that of any other nut and it has been discovered that due to this unique structure, almond shells may be readily broken down, by use of conventional equipment designed for grinding other materials, into particles having proper size distribution required to inhibit, reduce or alleviate drill string sticking.

The almond shell consists of a hard inner core surrounded by a relatively thick and coarse outer layer which is interlaced with fibers. The hard inner core is thicker and present to a greater extent in soft almond shells relative to hard almond shells. When this shell is initially processed to a rough grind in a hammer mill or other grinding equipment, the inner core breaks down into relatively thin flakes or plates and the outer portion breaks down into fibers and granules. The granules being particles other than flakes or fibers and having no uniform geometrical shape. The desired gradation in particle sizes is obtained through the proper control of the grinding operation.

It is known by those skilled in the art that the almond shell, a cellulose fiber material, can function as a lost circulation material. See, for example, Borchardt U.S. Pat. No. 2,799,647, incorporated herein by reference. According to Borchardt, these flakes, fibers and granules found in a single material, are ideal for lost circulation purposes, when combined with particle size distribution. In use, as the drilling fluid containing this material passes into a porous or fractured formation, the large flakes, fibers and granules form a partial bridge across the openings slowing down the rate of loss of fluid and leaving smaller voids to be sealed. The flakes appear to make the major contribution toward this partial bridge formation although the large fibers and granules cooperate therewith. Due to the importance of flakes in Borchardt, it is understandable why he prefers the soft shell variety of almonds shells. After the formation of the partial bridge, the progressively smaller flakes, fibers and granules come into play, bridging or plugging the progressively smaller voids until the seal is complete.

In Borchardt, it is disclosed that the shells are ground in a hammer mill and sized from No. 2 Tyler mesh to 48 mesh with small percentages above and below. A portion of this material, preferably about 20% thereof, is further ground roughly from Tyler 48 mesh to 325 mesh with a small percentage below 325 mesh. The fine ground material is thoroughly blended into the coarse ground material to provide the finished product.

The Borchardt almond shell additive is composed of flakes in a size gradation ranging from about ½ inch length to about 1/64 inch length, fibers from about ¾ inch length to 1/64 inch length and granules ranging in size from 8 to 325 mesh. It is extremely important in Borchardt that the grinding operation be carried out so that there are substantial amounts of flakes, fibers and granules, and that the ground material contain varying sizes of each of such particles. By "gradation in particle size" as used by Borchardt, it is meant that there is a substantial quantity of material of each size within the useful range, i.e., there is a substantial quantity of the fine material, a substantial quantity of the intermediate size material, and a substantial quantity of the coarser size material.

Unfortunately, Borchardt's particle size distribution (PSD) for an effective lost circulation materials renders the shell useless for controlling pressure differentials due to the large grind obtained in processing, specifically the flakes and fiber portions of the grind. Accordingly, the almond shell additive of the present invention consists essentially of granules, such as disclosed in Borchardt. The flakes and fibers are either removed or ground further to become granular in size.

The following specific example illustrates a process for preparing a specifically ground almond material used as the almond shell additive in the present invention, but it is to be understood that the invention is not to be limited thereto.

The raw material consists of almond shells in large pieces as they come from the sheller, and preferably having a moisture content below 10%. The almond shell may consist of one or more of the varieties which include, but are not limited to, Baker, Ballard, Ballico, Barclay, Bathan, Bigalow, Butte, California, Carmel, Carrion, Cartagena, Commercial, Davey, Drake, Emerald, Eureka, Frances, Fritz, Granada, Hardshell, Hardpareil, Harriott, Harvey, Jeffery, Jordanolo, Jubilee, Kapareil, Languedoc, Legrand, Livingston, Liewelling, Long IXL, Merced, Miller, Milo, Mission, Monarch, Money Tree, Mono, Montery, Neplus, Nonpareil, Norman, O'Neil, Oakley, Padre, Pearl, Peerless, Planada, Plateau, Price, Profuse, Ripon, Robson, Routier, Ruby, Sellers, Sierra, Smith XL, Solano, Sonora, Standart, Sultana, Surret, Tarrongona, Texas, Thompson, Tioga, Tokyo, Trembath, Ungaretti, Valencia, Vesta, Walton, Wawona, Wemerel, Yosemite, 12–38 and Wood Colony.

The shells are ground processed, for example in an attrition mill, hammer mill and other grinding process capable of achieving the desired PSD, with the material initially being discharged across a U.S. Mesh Number 8 screen. Material which will not go through this screen is returned to the mill for additional grinding. Except for very fine material drawn off by the environmental dust collection equipment, all of the ground material is used.

The preferred form of the ground almond shells are particles having a substantially even particle size distribution from 100 to 2000 microns with no more than 20 percent by weight of the particles less than 100 microns. Relationship of microns to mesh sizes are illustrated in Table 1. All mesh sizes used in the description of the invention are in terms of U.S. Standard Sieve Series, Fine Series of 1940.

TABLE 1[a]

Definition of Particle Size

| PARTICLE SIZE | PARTICLE CLASSIFICATION | SIEVE SIZE |
| --- | --- | --- |
| Greater Than 2000 micron | Coarse | 10 |
| 2000–250 micron | Intermediate | 60 |
| 250–74 micron | Medium | 200 |
| 74–44 micron | Fine | 325 |
| 44–2 micron | Ultra Fine | — |
| 2–0 micron | Colloidal | — |

[a]From: API Bul.13C (June, 1974). American Petroleum Institute, Dallas.

In order to minimize any significant adverse rheological affects on the fluid, this invention will not have greater than 20 percent by weight almond shell particles less than 100 microns in size. Since these smaller particles play a very important role in reducing formation permeability, the small size processing of these particles becomes critical. Preferably, the particle size distribution of the particles less than 100 microns in size comprises about 40 to 100 percent of the particles therein having a size greater than 50 and up to 100 microns and 0 to about 60 percent of the particles therein having a size from about 1 to 50 microns. This roughly corresponds to about 90 to 100 percent by weight of said small particle fraction having a particle size greater than 50 microns and less than 100 microns and 0 to about 60 percent by weight of said small particle fraction having a particle size from about 1 micron to 50 microns, respectively.

The material produced as indicated above modifies the size of almond shell particles enhancing deformability yet reducing surface area to minimize effects on fluid rheologies. Grinding the almond shells to the required PSD also optimizes the release of naturally occurring lignin in the shell (approximately 30 percent by weight content) which acts as a sealant and bonding agent within the matrix of the deformed and compressed shell particles in the pore throats of the formation. The utilization of this lignin content is enhanced by increasing the pH of the well working fluid to a pH ranging from about 9 to about 14. The pH may be increased by adding any base typically used in drilling fluids, for example, caustic (NaOH) and KOH.

This particular grind of almond shell particles also will allow this invention, upon being added to the fluid system, to be pumped through screens of downhole mud motors and MWD (Measurement While Drilling) tools now commonly used in directional or deviated wells. Since the grind enhances particles deformability and compressibility, the invention can also be pumped through any size bit &jets or nozzles. Preferably, in grinding, at least 5% by weight of the almond shell additive of the present invention has a particle size near the 2000 micron range or greater. These larger particles are ground so that they are more spherical in shape but less deformable than the smaller particles which tend to be elongated splinter-type particles. This will enable the larger particles to aid in cleaning the drill bit once added to a working fluid by scraping off some of the accumulated clays and shales. These larger particles will also adhere to the inside perimeter of the established borehole wall scale. These larger particles will be capable of rotating after embedding in the wall cake providing a ball bearing affect once contacted by the drill string.

Preferably, in processing the almond shell particulate, a high boiling point liquid hydrocarbon of the type used in well working fluids may be adhered to the particles through a misting process of at least 0.1 percent by weight. This enhances the water wetting characteristics of the almond shell particles and in higher concentrations could enable the invention to impart lubricity to the section of the wall cake exposed to the borehole and enhanced seepage loss reducing characteristics. Examples of the high boiling point liquid hydrocarbon are diesel oil, low toxicity mineral oil, edible almond oil, etc. Alternatively, such a liquid hydrocarbon can be added to aqueous-based well working fluids containing the almond shell additive of this invention or to which the almond shell additive is to be added. The almond shell additive sorbs the hydrocarbon and concentrates it on the sides of the well thus generally further decreasing the seepage loss from the well working fluid. In well working fluids which contact potential oil and gas producing formations, a suitable organic liquid can be substituted for the liquid hydrocarbon such that the organic liquid will not interfere with the hydrocarbon analysis of the formations.

Preferably the hydrocarbon/organic liquid is present in the well working fluid or in admixture with the almond shell additive in an amount to provide a weight ratio of the hydrocarbon/organic liquid to the almond shell additive from about 0.1/1 to about 2/1, most preferably from about 0.15/1 to about 1/1. The hydrocarbon/organic liquid may be present in the drilling fluid in concentrations in excess of the amount which can be sorbed by the almond shell additive of this invention.

The almond shell additive may also be used as a carrying agent for Gilsonite or other asphaltene-type material, if needed in addition to he almond shell additive, to stabilize shale sections in wells. Since Gilsonite is not water soluble or dispersible, a wetting agent should be admixed with the Gilsonite/almond shell additive to ensure adequate dispersion of the Gilsonite in an aqueous-based drilling fluid. Preferred wetting agents are non-ionic surfactants such as polyethoxylated alcohols, alkyl phenols, and the like organic materials which contain at least one hydroxyl group and a large hydrocarbon radical within their molecular structure. Gilsonite and asphaltene-type materials have been used to stabilize sloughing shales to reduce borehole erosion. The Gilsonite extrudes into the pores, fractures, and bedding planes to reduce or minimize filtrate and whole mud invasion and thus bond the matrix to prevent sloughing. The almond shell additive of this invention performs a similar function and then also functions to bridge across the surface of the shale, reducing the seepage of the drilling fluid into the formation. The almond shell additive in the drilling fluid enables the drilling fluid to form an impermeable filter cake on the sides of the borehole thus minimizing the loss of fluid to the formations contacted by the drilling fluid.

The well working composition of our invention can be prepared by adding the almond shell additive to the water-based or oil-based well working fluid. A water-based well working composition will generally contain a suspending agent, such as clay or polymer, weight material which may be insoluble, such as barite, siderite, galena, ilmenite, hematite, and the like, or which may be a soluble salt such as sodium chloride, potassium chloride, calcium chloride, calcium bromide, zinc bromide and the like, other fluid loss additives such as starch, CMC, carboxylmethyl starch, polyarcylates and other polymers, and other additives such as viscosity control agents, oil, lubricants, emulsifiers, other lost circulation materials, other seepage loss reducing additives and other functional additives. Oil-based well working fluids will generally contain additives which provide these same functions, with the exception of the lubricants. Representative suspending agents are the organophilic clays. Representative weight materials are the insoluble materials enumerated above. Representative fluid loss control additives are asphaltic materials, organophilic humates, organophilic lignosulfonates, polymers and the like. Representative emulsifiers are calcium soaps, such as calcium tallate, fatty amides, partial fatty amides of polyamines, and the like. Additionally, crosslinkable polymers and crosslinking additives such as those disclosed in House, U.S. Pat. No. 5,004,553, incorporated hereby by reference, may be used.

The amount of the almond shell additive that is added to the well working fluid needs only to be an amount which is effective in reducing or inhibiting the sticking of pipe or to correct a stuck pipe problem. Generally, the more additive added while maintaining acceptable rheological properties of the drilling fluid, the lower the likelihood of a sticking situation occurring. Preferably, there is added about 1 PPB to about 100 PPB of the almond shell additive, more preferably about 1 PPB to about 50 PPB, most preferably from about 3 PPB to about 20 PPB.

For reducing seepage loss, the amount of the almond shell additive of this invention added to the well working fluid needs only to be an amount which is effective in reducing the seepage loss to the desired extent. Generally, the more additive added, the greater the seepage loss reduction. Preferably, there is added from about 1 PPB to about 100 PPB of the almond shell additive, more preferably about 1 PPB to about 50 PPB, most preferably from about 3 PPB to about 20 PPB.

Another embodiment of our invention is a process to decrease the seepage loss or spurt loss of a well working fluid, particularly drilling fluids, which comprises adding to the well working fluid a quantity of the almond shell additive of this invention sufficient to effect such decrease. Generally, there will be required from about 1 PPB to about 100 PPB of the almond shell additive, more preferably about 1 pound per 42 gallon barrel (PPB) to about 50 PPB, preferably from about 3 PPB to about 20 PPB.

The almond shell additive of this invention may be added to the well working fluids, either aqueous-based or oil-based, utilizing the slugging technique disclosed in Cowan et al., U.S. Pat. No. 4,531,594, incorporated herein by reference. Thus, a concentrated "pill" of about 20–50 bbl total volume can be made by mixing from about 15 PPB to about 100 PPB of the additive in the well-working fluid. The pill will preferably contain from about 15 PPB to about 50 PPB of the almond shell additive. The pill may be formulated to also contain other fluid loss reducing additives as disclosed in U.S. Pat. No. 4,531,594. Typical fluid loss reducing additives and typical methods of employing the pill are set forth in U.S. Pat. No. 4,531,594.

The almond shell additive of this invention can be mixed with materials having a larger particle size distribution and the mixture used to combat larger losses of the fluid to the formations being drilled. Alternatively, the almond shell additive can be added separately to a drilling fluid to which a material having a larger particle size distribution is also added. However, the almond shell additive of the present invention is capable of sealing large pores on the order encountered in pea gravel.

EXAMPLES

In order to more completely describe the invention, the following non-limiting examples are given. In these examples and throughout this specification, the following abbreviations may be used: PPB=LB per 42 gallon barrel; API=American Petroleum Institute; WL=Water loss (fluid); HTHP=high temperature, high pressure; °F=degrees Fahrenheit; CC=cubic centimeters; CFL=complete fluid loss; PV=plastic viscosity; IS=initial spurt loss; TFL=total of fluid loss; sec=seconds: min=minutes; G.S.=gel strength; vol=volume; sq. ft.=square feet; YP=yield point, LB/100 sq. ft.; PSI=LB/sq. inch; CP=centipoise. All mesh sizes used in the description of the invention are in terms of U.S. Standard Sieve Series. See Table 21-16 on page 21-51 of Perry's *Chemical Engineers' Handbook,* 4th Ed., McGraw-Hill Book Co. @1963, incorporated herein by reference. A particle size designated +X indicates the particles were retained on a sieve of size X mesh. A particle indicated Y/Z indicates that the particles passed through a sieve of mesh size Y and were retained on a sieve of mesh size Z. A particle size designated –W indicates that the particles all passed through a seive of mesh size W.

In the following examples unless otherwise indicated, standard API drilling fluid tests were performed to produce the generated data. The tests were according to procedures recommended by the API and published in *Standard Procedure for Testing Drilling Fluids,* American Petroleum Institute, Washington, D.C. (9th ed. 1982).

Example 1

Figure 1:
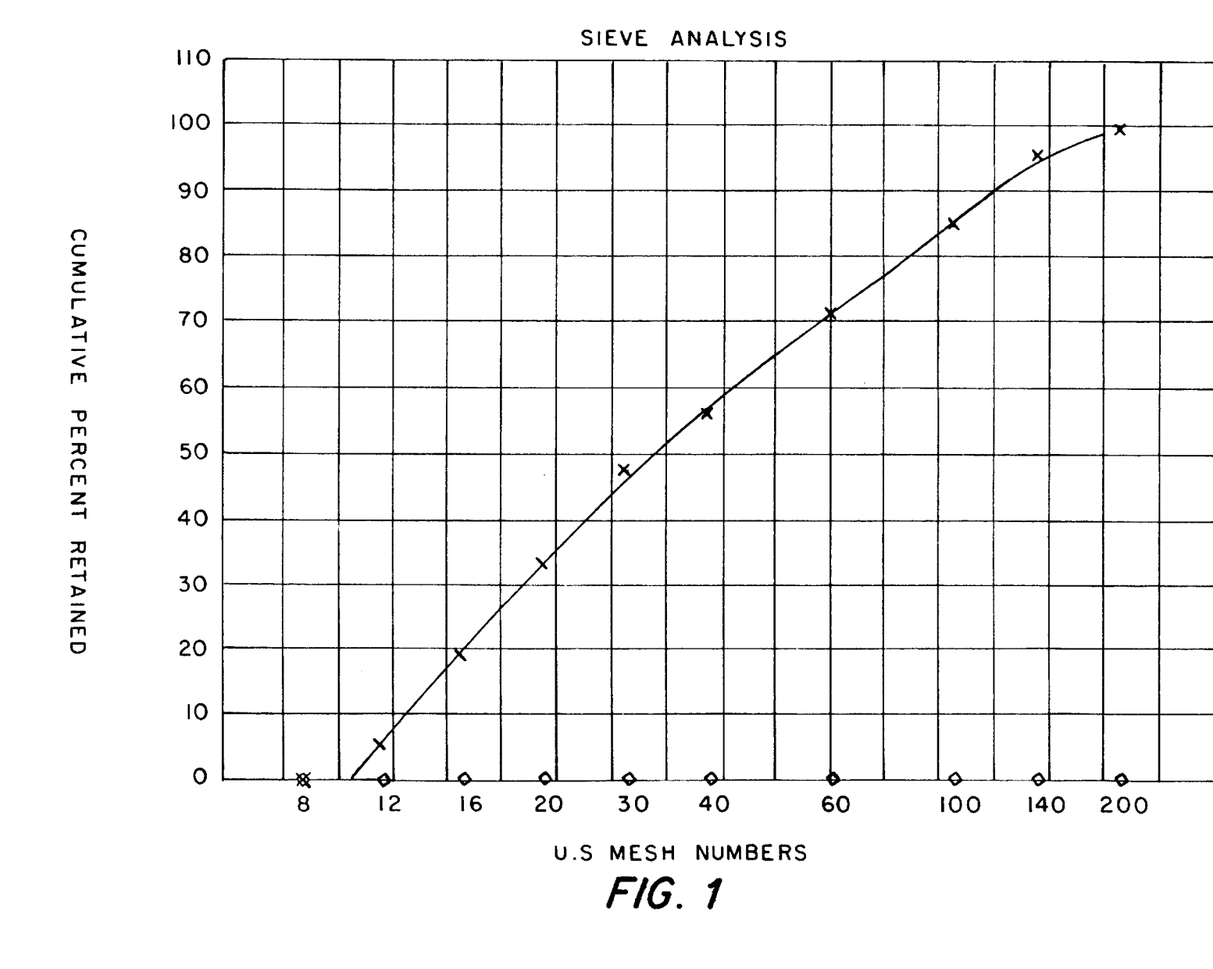
FIG. 1 is a graph depicting the PSD of an embodiment of the almond shell additive of the present invention.

An almond shell additive having the PSD shown in FIG. 1 prepared by attrition milling of mission almond shells (hard-type shells). The almond shells were crushed between a pair of metal plates and sieved on a No. 8 mesh screen. Materials not passsing through the No. 8 mesh screen were returned to the attrition mill for further crushing until all materials passed through the No. 8 mesh screen (2380 microns). As shown in FIG. 1, a substantially even particle size distribution is achieved for the crushed material for the intermediate particle fraction; i.e. material retained on the U.S. mesh numbers 12 (1680 microns), 16 (1190 microns), 20 (841 microns), 30 (595 microns), 40 (420 microns), 60 (250 microns), 100 (149 microns) and 140 (105 microns). Though not done on this sample, a brush moving across the surface of the respective sieve may be used to urge splinter-type particles with a cross-sectional dimension of the mesh size to pass through the respective screens.

About an 8 PPB equivalent of the almond shell additive was added to an 11.6 pounds per gallon generic #7 type mud consisting of 303.6 CC's of water, 25 PPB of bentonite, 154.8 PPB barite, 1.5 PPB sodium hydroxide, 3 PPB chrome lignosulfonate, 3 PPB lignite, 5 PPB drispac polymer and 25 PPB Rev. dust. The freshwater-seawater ratio was 1:1. This fluid was mixed for the 30 minutes at room temperature and the API RP 13B rheology obtained. The ability of the muds to seal off a highly permeable sand was evaluated in the following manner: 150 grams of a 20/40 mesh frac sand were placed in a standard API filter press with only the screen in place (no paper); water was added, and the water was drained to remove the free water; about a 1 BBL equivalent of a mud sample (350 CCs) was added to the API cell and 100 PSI differential pressure was applied as in the standard API fluid loss test; thereafter, the fluid which seeped through the sand pack was caught until the sand pack was sealed or rendered impermeable, i.e., when only drops of fluid emerge from the sand pack. The volume of the fluid which rapidly escapes upon initial pressurization is the spurt loss (initial spurt). The volume of the fluid collected in total at the end of the 30 minute time period is the Total Fluid Loss (TFL). The data obtained are given in Table 2.

TABLE 2

| TEST DESCRIPTION PARTICLES | BASE GENERIC #7 MUD | BASE MUD +8 PPB ALMOND SHELL |
|---|---|---|
| Plastic Viscosity (cp) | 37.0 | 42.0 |
| Yield Point (lb/100 sq. ft.) | 9.0 | 18.0 |
| Gel Strength (10 sec./10 min.) | 2/8 | 5/7 |
| API W.L. (cc/30 min.) | 7.0 | 6.4 |
| HTHP @ 250° F. (cc/30 min.) | 30.0 | 27.0 |
| Sand Pack (-Initial Spurt- CCs) | 64.0 | 0.0 |
| Sand Pack (CCs/30 min.) | CFL | 0.0 |

This test shows advantages of having pre-treated a drilling fluid with an 8 PPB concentration of an embodiment of the almond shell additive of the present invention. Rheological properties of the base fluid are not adversely affected as demonstrated by a comparison of both mud's plastic viscosities, yield points and gel strengths. The increased yield point in the treated fluid indicates increased carrying capacity of the fluid due to having at least partially hydrated the cellulose fiber matrix of the almond shell particles of the additive. As the drilling fluid is circulated or allowed to stand, these values will continue to increase until the additive is fully hydrated. This enables the fluid to carry more drill cuttings up the annulus and clean the hole. This parameter can be lowered simply by adding a conventional drilling fluid thinner, for example, water, diesel, and the like, to the mud system.

Both the API and HTHP fluid losses were reduced in the treated mud due to the additive's particle size distribution and the utilization of the naturally occurring lignin content therein. This results in a thinner, tougher wall cake and less formation damage due to fluid intrusion.

The sand pack test with the treated mud is indicative of complete initial spurt control resulting in less hole washout, reduced formation and environmental damage and reduction of the permeability of an unconsolidated sand. All of these factors greatly reduce the chance of deferentially sticking the drill pipe in an underpressured, unconsolidated formation.

Example 2

A standard API filter press was filled with about six (6) inches of Rainbo River Rocks (pea gravel) with only the screen in place (no paper). The metal cell wall was replaced with a tall, clear plexiglass cell wall in order to measure drilling fluid intrusion into the gravel before a seal was formed. Water was added and the water was drained to remove free water. Several additives described in Table 3 were tested by preparing a 50 PPB equivalent of the respective additive in an 11.6 pounds per gallon generic #7 type mud prepared using the formulation described in Example 1. About a 1 BBL equivalent of a mud (drilling fluid) sample (about 350 CCs) was added to the API cell and 150 PSI differential pressure was applied to the cell and held for ten minutes. Spurt loss, whole mud loss and mud intrusion into the pea gravel were measured and given in Table 5.

TABLE 3

Particle Size Distribution of Sample, % by Weight

| | SAMPLE[a] | | | |
|---|---|---|---|---|
| | MF | Sifted MF | NPC[c] | X |
| +25 | 41.5 | 0 | 63.5 | 1.0 |
| 25/50 | 28.4 | 0 | 27.1 | 9.0 |
| 50/80 | 12.6 | 0 | 3.2[d] | 14.0 |
| 80/100 | 5.5 | 0 | 4.5[e] | 20.0 |
| 100/140 | 6.8 | 56.7 | 1.0 | 0 |
| 140/200 | 3.6 | 30.0 | 0.7 | 24.0[b] |
| 200/325 | 1.5 | 12.5 | 0.1[f] | 29.9 |
| -325 | 0.1 | 0.8 | | |

[a]MF—fine ground mission almond shells
Sifted MF—Sample MF sifted through a 100 mesh screen, represents -100 mesh particles
NPC—Coarse ground nonpareil almond shell, inner shell not removed; believed to be within teaching of Borchardt, U.S. 2,799,647
X—a commercially available processed peanut shell additive.
[b]100/200
[c]average of three samples
[d]50/60
[e]60/100
[f]-200

The almond shells used for Sample MF was prepared using a hammer mill with an initial sieve size of a No. 8 mesh. Those materials not passing through the No. 8 mesh were returned for further grinding until all materials passed through the No. 8 mesh screen. The materials passing through the No. 140 mesh screen were laser counted on a Spectrex SPC-510 Particle Counter VG3. An aqueous suspension of the small particle fraction was prepared. The total suspended solids was 88768.02 ppm (mg/liter). The dilution factor was 1000:1. The total counts were 10393008/100 cc. The charaterization of the small particle fraction is shown in Table 4.

TABLE 4

| Size (micron) | Counts Percent | Surface Area Percent | Volume Percent | Weight Percent |
|---|---|---|---|---|
| less than 5 | 0 | 0 | 0 | 0 |
| 5–10 | 7.38 | 0.22 | 0.03 | 0.03 |
| 10–25 | 24.52 | 1.80 | 0.42 | 0.42 |
| 25–50 | 15.85 | 10.35 | 6.84 | 6.84 |
| 50–100 | 52.00 | 87.63 | 92.71 | 92.71 |
| greater than 100 | 0.25 | 0 | 0 | 0 |

TABLE 5

| Sample | Mud Intrusion (inches) | Spurt Loss (ml) | Whole Mud Loss at 10 min. (ml) |
|---|---|---|---|
| Generic #7 Mud | 6 | 350 | 350 |
| MF | 1.25 | 0 | 0 |
| Sifted MF | 6 | 110 | 290 |
| NPC | 6 | 40 | 190 |
| X | 6 | 90 | 350 |

These results clearly demonstrate the surprising properties of the almond shell additive of the present invention.

Example 3

In this example, an 8 PPB equivalent of the additives identified in Example 2 was prepared and tested in the manner according to Example 2, except that only 150 CCs of mud/additive were added to the cell. Another batch of the generic #7 mud was prepared using the formulation identified in Example 1. The results are given in Table 6.

TABLE 6

| Test Description | Generic #7 Mud | MF | Sifted MF | NPC | X |
|---|---|---|---|---|---|
| Rheology: | | | | | |
| at 600 RPM | 29 | 39 | 48 | 38 | 35 |
| at 300 RPM | 16 | 22 | 30 | 23 | 20 |
| Plastic Viscosity (CP) | 13 | 17 | 18 | 15 | 15 |
| Yield Point (LB/100 SQFT) | 3 | 5 | 12 | 8 | 5 |
| Gel Strength (10 sec/10 min) | 1/3 | 4/9 | 6/11 | 2/6 | 4/7 |
| API Water loss (ml/30 min) | 8 | 4.7 | 5.3 | 6.4 | 7.2 |
| HPHT at 225° F. (ml/30 min) | 20 | 13 | 14 | 15 | 16 |
| pH | 10.8 | 9.5 | 9.5 | 9.8 | 9.5 |
| Alkalinity (Pm) | 1.8 | 1.3 | 1 | 1.2 | 1.3 |
| Alkalinity Filtrate (Pf) | 0.4 | 0.3 | 0.2 | 0.2 | 0.3 |
| Sand Pack Test: | | | | | |
| Spurt loss | 150 | 0 | 0 | 10 | 0 |
| Water loss | 150 at 2 mins | 0 | 0 | 19 | 0 |

Again the MF sample out-performs the sifted MF and NPC samples demonstrating the importance of the particle size distribution of the almond shell additive of the present invention. The MF sample is of comparable performance to a commercially available processed peanut shell product (X), but out-performs this commercial product with respect to API water loss and HPHT fluid loss.

We claim:

1. An almond shell additive for well working fluids, said additive consisting essentially of ground almond shells consisting essentially of
    an intermediate particle fraction having a substantially even particle size distribution between particle sizes of 100 microns and 2000 microns,
    a large particle fraction comprising at most about 5 percent by weight of said additive and having a particle size greater than 2000 microns, and
    a small particle fraction comprising at least 3 percent and at most 20 percent by weight based on said additive and having a particle size less than 100 microns.

2. The almond shell additive according to claim 1, wherein said small particle fraction comprises from about 40 to 100 percent of the particles of said small particle fraction having a particle size greater than 50 microns and less than 100 microns and from 0 to about 60 percent of the particles of said small particle fraction having a particle size from about 1 micron to 50 microns.

3. The almond shell additive according to claim 1, wherein said small particle fraction comprises from about 90 to 100 percent by weight of said small particle fraction having a particle size greater than 50 microns and less than 100 microns and from 0 to about 10 percent by weight of said small particle fraction having a particle size from about 1 micron to 50 microns.

4. A well working fluid comprising as a major constituent an oily petroleum liquid and an effective amount of an almond shell additive according to claim 1 for inhibiting sticking of a drill string.

5. The well working fluid according to claim 4, wherein the effective amount of said additive is from about 1 to about 100 pounds per barrel.

6. A well working fluid comprising as a major constituent an aqueous liquid and an effective amount of an almond shell additive according to claim 1 for inhibiting sticking of a drill string.

7. The well working fluid composition according to claim 6, wherein the effective amount of said additive is from about 1 to about 100 pounds per barrel.

* * * * *

UNITED STATES PATENT AND TRADEMARK OFFICE
CERTIFICATE OF CORRECTION

PATENT NO. : 5,861,362
DATED : January 19, 1999
INVENTOR(S) : Mayeux et al.

It is certified that error appears in the above-identified patent and that said Letters Patent is hereby corrected as shown below:

On the title page, item [73] insert the following:

-- Assignee: Blue Diamond Growers, Sacramento, California, of Earl C. Ruby's undivided interest. --

Signed and Sealed this

Twentieth Day of July, 1999

Attest:

Q. TODD DICKINSON

*Attesting Officer*    *Acting Commissioner of Patents and Trademarks*